United States Patent [19]

Saurin et al.

[11] 4,315,132
[45] * Feb. 9, 1982

[54] PROCESS AND APPARATUS FOR WELDING TUBULAR BODIES

[76] Inventors: Emmanuel E. V. V. Saurin, 28, rue Eugène Prevost, Lagny; Ezio V. Gariglio, 1, Allée du Roussillon, Neuilly-sur-Marne, both of France

[*] Notice: The portion of the term of this patent subsequent to May 1, 1996, has been disclaimed.

[21] Appl. No.: 105,873

[22] Filed: Dec. 21, 1979

Related U.S. Application Data

[63] Continuation-in-part of Ser. No. 34,015, Apr. 27, 1979, abandoned, which is a continuation of Ser. No. 758,785, Jan. 12, 1977, Pat. No. 4,152,573.

[30] Foreign Application Priority Data

Jan. 20, 1976 [FR] France .................................. 76 01400

[51] Int. Cl.³ .............................................. B23K 27/00
[52] U.S. Cl. ........................ 219/121 LD; 219/121 LC
[58] Field of Search ..... 219/121 L, 121 LM, 121 LC, 219/121 LD, 121 EB, 121 EM, 121 EC, 121 ED, 61.11, 61.13, 64, 158; 113/116 UT, 120 M; 228/147, 157

[56] References Cited

U.S. PATENT DOCUMENTS

| | | | |
|---|---|---|---|
| 837,976 | 12/1906 | Taylor | 113/116 UT |
| 1,866,256 | 7/1932 | Heineman | 113/116 UT |
| 2,502,012 | 3/1950 | Kinkead | 219/61.11 X |
| 2,950,376 | 8/1960 | Wögerbauer | 219/61.11 X |
| 3,118,406 | 1/1964 | Stanton | 219/61.13 X |
| 3,337,944 | 8/1967 | Morris | 219/61.11 X |
| 3,716,908 | 2/1973 | Rowell | 228/147 X |
| 3,759,203 | 9/1973 | Frankenberg | 113/120 M X |
| 3,937,914 | 2/1976 | Larson et al. | 219/61.13 X |
| 3,969,604 | 7/1976 | Baardsen | 219/121 LM X |
| 4,141,456 | 2/1979 | Hart | 219/158 X |

FOREIGN PATENT DOCUMENTS 1343387  1/1974  United Kingdom .

OTHER PUBLICATIONS

Cook, "Laser Welded Pipe Liners", *Electro-Optical Systems Design*, vol. 7, No. 11, pp. 20–22, Nov. 1975.

*Primary Examiner*—C. L. Albritton
*Attorney, Agent, or Firm*—William R. Hinds

[57] ABSTRACT

A method and a device for manufacturing a tubular body for a preserved food can; two opposite edges of a metal sheet are joined by the action of a laser beam. The tubular body is subsequently expanded radially for increasing its cross-section.

10 Claims, 8 Drawing Figures

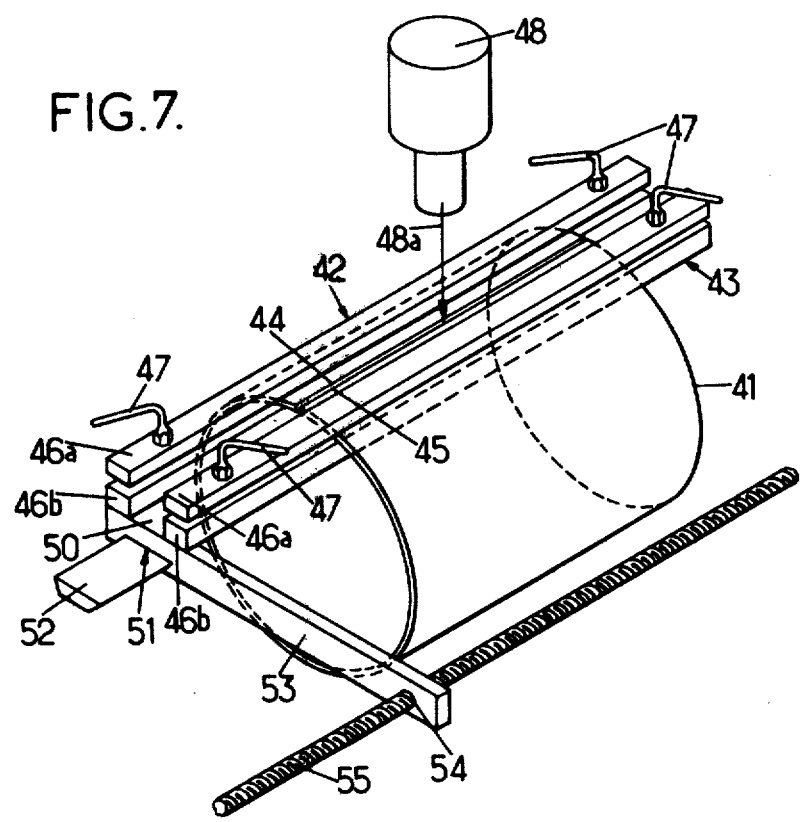

PROCESS AND APPARATUS FOR WELDING TUBULAR BODIES

CROSS REFERENCES TO RELATED APPLICATIONS

This application is a Continuation-in-Part of Application Ser. No. 34,015 filed Apr. 27, 1979 and now abandoned, which is a continuation of Application Ser. No. 758,785 filed Jan. 12, 1977, now U.S. Pat. No. 4,152,573.

BACKGROUND AND SUMMARY OF THE INVENTION

The present invention relates to a method of manufacture of tubular bodies, particularly for preserved food cans, by rolling up a thin metal sheet (having a thickness typically not in excess of 0.5 mm) into a tube and welding the adjacent edges of the rolled sheet.

A conventional process for manufacturing tubular bodies for preserved food cans consists in rolling up a rectangular metal sheet to bring the two edges together, seaming the edges to one another and sealing the junctions by brazing with a tin-lead alloy.

This process has drawbacks: the overlapping of the opposite sides of the metal sheet constitutes a loss of material and creates a bead whose edges hinder the crimping of the bottoms of the can and which increases the number of rejects. The lead contained in the brazing material contaminates the food products.

Numerous attempts have been made to find a more satisfactory solution, particularly by electrically welding overlapping edge regions of the rolled up sheet. The use of brazing material is avoided and the amount of overlap may be decreased when elaborate continuous electric welding with wire-electrode on automatic machines is used. There remains however an overlap which constitutes a longitudinal bead.

It is an object of the invention to improve upon the prior apparatuses and methods for manufacturing tubular bodies having a low wall thickness.

A more particular object of the invention is to provide a method of forming tubular metal can bodies which do not exhibit a longitudinal bead.

A further object of the invention is to provide a method of forming tubular bodies for preserved food cans which includes a radial expansion step.

In general, the present invention contemplates a welding apparatus which comprises support means provided with a pair of elongated parallel clamping means actuatable for clamping two opposite edge regions of a metal sheet portion formed into a tube section, with corresponding confronting edges of the edge regions situated between the pair of clamping means next to each other and level to each other for forming a rectilinear junction line situated between the pair of clamping means, and for releasing said edge regions, said clamping means being adapted to cooperate with the sheet portion for clamping the latter with clamping forces which are substantially perpendicular to the edge regions without substantially forcing said edges into abutment, said clamping means forming the only means which holds the sheet material portions in edge-to-edge relation forming said junction line. The apparatus further comprises stationary guiding means operatively associated with said support means for guiding the latter along a path parallel to said junction line and laser beam generating means having, with respect to said support means, a location for directing a laser beam between said clamping means at a point in the path of said junction line to engage the sheet portion at the junction line formed by the edges thereof. Means operatively associated with the support means are adapted to move the latter with respect to said laser-beam generating means in a direction and with a speed causing the sheet portion to be welded progressively along said junction line.

Such an apparatus provides bodies without longitudinal beads which do not require addition of filler metal.

The weld which can be obtained with laser welding and with high quality electric welding is of such strength that the metal sheet rather than the weld fails when the can is subjected to excessive expansion.

A process according to another aspect of the invention makes use of that feature: that process includes the steps of rolling up a metal sheet of small thickness until the opposite edge portions of the sheet contact, welding said edge portions by a method which insures a resistance to tensile forces equivalent to that of the metal sheet and subjecting the tubular body to radial expansion.

The expansion step provides numerous advantages. If the tubular bodies must be transported before use, they may be subjected to the expansion operation on arrival, which reduces considerably the volume to be transported. The expansion allows starting with sheet metal having a thickness greater than that which it is desired to attain for the can. In particular, when a thickness from 0.15 to 0.16 mm can be accepted (cans which have not to withstand successively a high internal pressure and vacuum during a further sterilizing operation), one may start with conventional sheet metal from 0.2 to 0.3 mm thick, less costly than the 0.15 mm metal sheet because of the economy of a second rolling, during manufacture thereof. The expansion step may be carried on the same apparatus as welding or on a separate apparatus.

Welded seams, whatever their method of manufacture, may present micro-leaks which, in the case of cans for preserved foods, cause impairment of the products. Such micro-leaks are difficult to detect. But, when the body is subjected to expansion, the micro-leak results into tear easily discernible on inspection and this is an additional advantage.

For obtaining a high quality weld, the confronting edge portions of the metal sheet should be accurately positioned during laser welding, for avoiding overlap, radial offset and distortion which would result in small gaps between the edges.

For that purpose, the rolling and welding steps may be carried out by circulating a metal sheet having a length much in excess of the length of said tubular body into an external guide which rolls up said sheet until its opposite edges are in contact and said edges are pressed against a stationary internal core, the gap between the core and guide being selected for preventing overlapping of the edges and then through the location where the laser beam is focussed.

The core may occupy the whole cross section of the tubular body. However, a core may also be provided on which only the edge regions of the sheet will bear. The laser beam is advantageously focussed over a diameter less than 0.05 mm and in the thickness of the edge-to-edge joint.

This extremely fine focussing allows the heat required for melting the metal sheet to be released only there where it is required. The laser energy is used under the best conditions and the amount of heat in the metal is kept to a minimum. When tin-plate is used, focussing has the advantage of only volatilizing the tin over an extremely small width, and reducing the risks of subsequent corrosion. This process also makes possible to use black steel sheet, which is subsequently coated with varnish; iron sheet with an electrolytic coating of chromium or nickel; or iron sheet whose surface layer is slightly tin-alloyed. It may be reminded that varnish does not adhere firmly to the edge of the sheet iron when there is an overlap, with the risk of corrosion, particularly from inside in the case of cans for preserved foods.

The laser will be advantageously a continuous emission laser, although the use of a pulsed laser may be contemplated having a sufficiently high frequency for the welding to be continuous. Typically, the laser used will emit in the infrared. When it is desired to weld bodies of cans for preserved foods or drinks, a sheet 0.2 to 0.3 mm thick may be used and a minimum power density of 5000 kW/cm$^2$ will be generally required in order to have an acceptable speed of advance. This result may particularly be reached with a $CO_2$ laser.

The sides of the sheet must have a straightness tolerance compatible with the dimensions of the focal spot of the laser, i.e. in practice less than 0.05 mm, to avoid gaps between the contacting edges. The radial offset (in the direction of the thickness of the sheet) shall not exceed 20% of the thickness.

In another embodiment of the invention, the edges of an individual metal sheet used for manufacturing a tubular body are retained in contact during welding by claws against which the regions of the sheet close to the edges are retained by vacuum forces, said claws being located to retain the edges without exerting substantial abutting forces in the circumferential direction of the tubular body.

The invention will be better understood from the following description of particular embodiments of the invention. The description refers to the accompanying drawings.

SHORT DESCRIPTION OF THE DRAWINGS

FIG. 7 is a diagrammatic perspective view of another device for carrying out the method according to the invention;

PARTICULAR DESCRIPTION OF PREFERRED EMBODIMENTS

Figure 1:
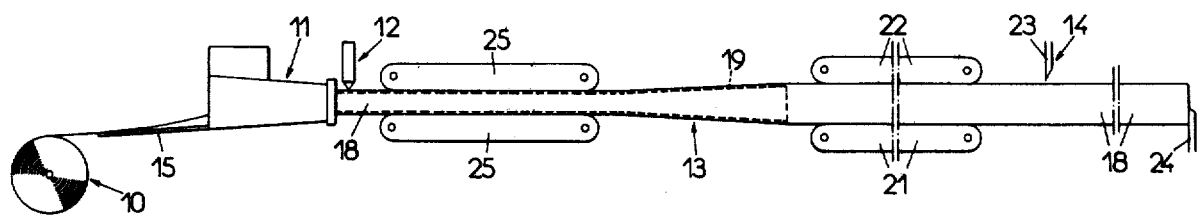
FIG. 1 is a general diagram, in elevation, of an apparatus for carrying out the process of the invention.
Figure 4:
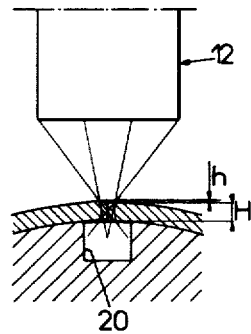
FIG. 4 is a simplified diagram showing the relative location of the edges of the metal sheet during welding.

The apparatus shown schematically in FIG. 1 is intended to supply tubular bodies from a reel of strip iron. It will be assumed that the tubular bodies are to be used as bodies of cans for preserved foods.

The apparatus may be regarded as comprising successively in the travelling direction of the sheet iron, a feed unit 10, a shaping unit 11, a welding generator 12, an expansion unit 13 and a sectioning station 14.

The feeding unit 10 may comprise a reel of strip-iron sheared in width with an accuracy in straightness of approximately 0.01 mm. This strip-iron may be annealed sheet iron, which may be cut with the required accuracy.

Figure 2:
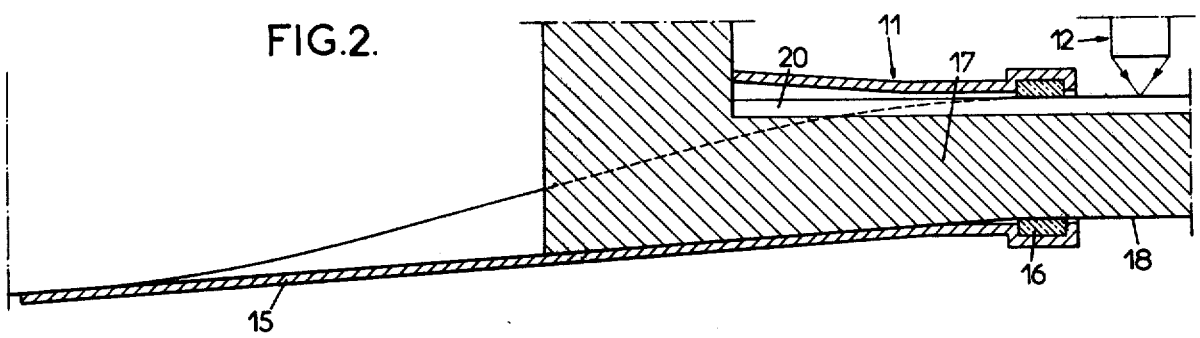
FIGS. 2 and 3 are views, on an enlarged scale, respectively in vertical section and in horizontal section, of the rolling unit of the apparatus.
Figure 3:
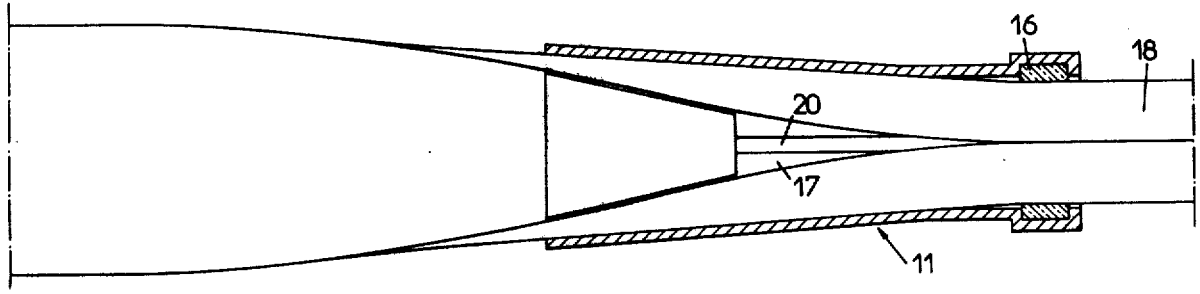

Rolling unit 11 (FIGS. 2 and 3) comprises an external guide 15 having for example a slope of about 14% on which the sheet iron slides towards the gap between an outer ring 16, advantageously made from ceramic material, and an internal core 17, advantageously made from graphitic steel. The internal diameter of ring 16 and the external diameter of core 17 are slightly less than the external and internal diameters of tube 18 to be formed, the difference being the same over the two diameters. In practice, for a diameter between 5 and 10 cm, the difference between the diameter of the core and the internal diameter of the tube to be formed will be less than $10\mu$, typically of $8\mu$ for sheet iron 0.2 mm thick.

Due to its conicity, the guide progressively rolls up the strip-iron until the edges are in contact, from a point situated in the immediate vicinity of ring 16.

The welding must be effected in the immediate vicinity of ring 16, to avoid gaping of the edges of the tube 18, delivered by the rolling unit 11. In practice, the maximum distance between the point where the welding is effected and the outlet of ring 16 is about 100 mm. This distance will however be given as low a value as possible.

The welding laser generator should concentrate the energy on a very small size focal spot, so as to obtain a power density of at least 5000 kW/cm$^2$. In practice, the laser power should be 1 kW, at least. Then a welding speed of the order of 20 m/mn can be obtained and must be maintained with an accuracy of the order of ±5%. The speed may be substantially increased with a more powerful laser, of 2 kW for example.

Generator 12 may comprise a $CO_2$ laser supplying an infrared beam at $10.6\mu$. The cylindrical laser beam will be focussed by a lens whose focal length will be as short as possible, since reduction of this focal length results in an increased tolerance on positioning in peripheral direction. With a continuous emission laser of 1 kW and lens having a focal length of 2.5 inches, deviations of up to 0.08 mm in the width direction are allowed. In all cases, the tolerance h for displacement in height of the two edges is of the order of 0.2 H, H being the thickness of the sheet iron, and the focal spot must be formed within the thickness of the weld, between the faces of the sheet iron.

The laser need not be placed in the immediate vicinity of the welding station. In practice, it will often be advantageous to place it at a distance (for instance greater than 1 m) and to reflect its cylindrical output beam towards the welding point where it is concentrated by the lens. To prevent projections of material from damaging the focussing lens, the beam is advantageously directed obliquely in relation to the tube 18 rather than perpendicularly.

The device shown in FIG. 1 comprises, after the welding station, a zone in which the welded tube is guided between driving caterpillar tracks 25 towards the expansion unit. The essential element of this unit is an internal mandrel of low conicity (a few percent). Mandrel 19 is secured to core 17 and remains stationary.

Lubrication of mandrel 19 may be ensured by oil-feed from the rolling unit. This oil-feed may be effected by means of a groove 20 (FIG. 2) provided in the upper part of core 17, finishing in oil-ways for distributing oil on mandrel 19. Groove 20 is located in front of the laser beam and avoids local heating up of the core.

Tube 18 is removed from mandrel 19 by a constant speed drive mechanism which may be of any type usually used, for example in cable making. The mechanism may comprise several caterpillar tracks, such as those shown at 21 and 22 in FIG. 1.

Finally, the apparatus comprises a sectioning station formed by a shearing machine only the blade 23 of which is shown, which intervenes when tube 18 arrives against a stop 24. The tube may be sheared at the station at a length which is several times the height of an individual can body. Then the sections are subsequently divided at unit height on a high output machine.

In practice, the expansion carried out on the device will be generally of approximately 20% of the diameter.

By way of numerical example, it may be indicated that an apparatus for manufacturing bodies of cans for preserved food having a volume of 0, 75 l comprises a shaping unit about 1 m long, a free zone of 1 m provided with pulling caterpillar tracks 25, an expansion zone of 0.60 m, a pulling zone of 2 m equipped with caterpillar tracks 21 and 22.

The laser generator may be replaced with a focussed electron beam generator of sufficient power and energy since the electrons must traverse air between the output of the generator and the weld location.

The successive work stations may be provided for supplying tubular bodies whose cross-section is not circular but flattened (which facilitates transport), polygonal with rounded angles or even oval or elliptic shape (which facilitates guiding of the edge regions).

Rather than a continuous manufacturing process from a reel of metal sheet, a process for manufacturing each body individually may be used. Then, each body in turn will be expanded on a machine which may be located immediately after the welding unit.

Figures 5A, 5B:
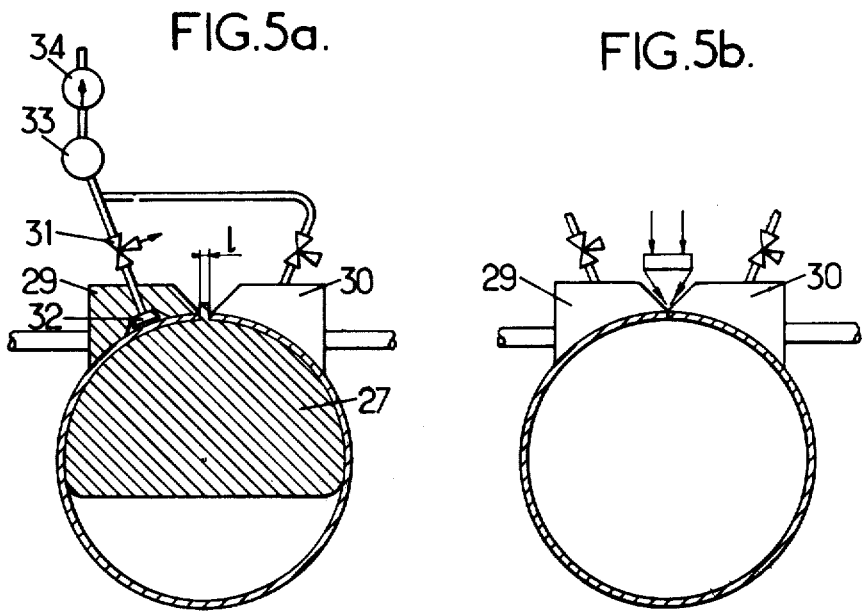
FIGS. 5a and 5b are schematic sectional views of claws for maintaining the edges of the metal sheet in contact during welding.

Referring to FIGS. 5a and 5b, there is shown two successive steps of the welding process. First, a metal sheet is rolled up on a conventional rolling machine (not shown) which delivers an open cylinder which is biased toward closure by its own resiliency. There is no need to describe such rolling units since they can be of the type currently used for manufacturing tubular bodies on electric welding units which use an electrode wire. The rolling unit is located to deliver the metal sheet on a mandrel 27 (FIG. 5a) provided with a radially directed longitudinal rib of width 1. The resiliency of the sheet retains the two edges in contact with the rib.

During the welding operation, the edges should be retained against each other precisely, but without exerting circumferentially directed forces which would result in radial distortions of an extent inconsistent with the low axial depth of the zone in which energy focussing occurs.

For that result, claws 29 and 30 are used against which the portions of the sheet close to the edges are retained by vacuum forces. The claws 29 and 30 are first applied against the sheet as indicated on FIG. 5a. Solenoid valves 31 are then energised to connect rubber cups 32 located in chambers of the claws to a vacuum reservoir 33 provided with vacuum pump 34. Several cups should be provided in each claw and connected to the same solenoid valve. The solenoid valves 31 are of the three-way type and connect the cups to atmosphere when de-energised. They are located as close as possible to the cups for reducing the volume which is alternately under vacuum and under atmospheric pressure at a minimum.

When the claws have adhered to the portions of the sheet close to the edges, both claws are moved together (transversally to the direction of the drawing when referring to FIG. 5a). When the claws have moved beyond the rib, one of the claws is moved toward the other by distance 1. Then, welding is carried out by the same process as described in U.S. Pat. No. 4,152,573, as illustrated on FIG. 5b. As soon as the tubular body has moved beyond the welding beam, it is released by de-energising the solenoid valves 31. The claws are then brought back to their starting position and grip a new rolled sheet. Several sets of claws will generally be provided and moved along a closed path in a way similar to a merry-go-round.

Figure 6:
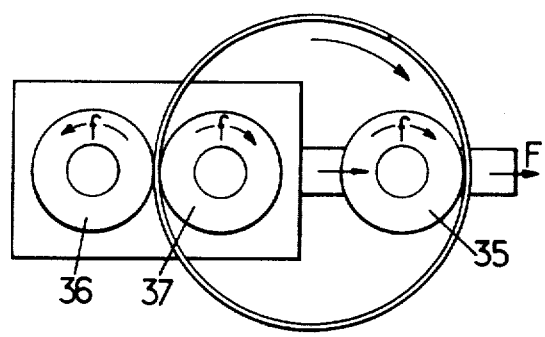
FIG. 6 is a schematic view of a device for radially expanding a tubular body.

The expansion step may be carried out on a machine located immediately after the welding unit. Referring to FIG. 6, there is shown a machine which comprises two pressing rollers 36 and 37 and an expansion roller 35. The tubular body is inserted between rollers 36 and 37 which are then rotated as indicated by arrows f and roller 35 is moved in the direction of arrow F until the required expansion rate has been attained. Then the tubular body is ejected. In practice, several rollers 35 carried by the same carriage will generally be provided.

Such an expanding machine may be located in a plant separate from the welding apparatus, situated for example in the plant where the bottoms are welded. It allows a reduction in transport costs, the individual bodies being manufactured from sheet metal of a thickness greater than the thickness of use (for example close to 0.50 mm), shipped and expanded on arrival.

Referring now to FIG. 7, there is illustrated an apparatus for forming tubular bodies from individual rectangular metal sheets 41.

A rectangular metal sheet 41 is formed into a tube with adjacent confronting edges, which is held by two longitudinal parallel vices 42 and 43, the opposite sides 44 and 45 of the said metal sheet 41 being placed edge to edge without overlap. Each vice is made up of two parallel clamping bars 46a, 46b, which are assembled and pressed together by means of clamping screws 47. A laser-beam generating device 48 is arranged above the vices 42 and 43 in such a manner that the laser beam 48a passes substantially along the middle line between the said vices and the impact on the metal sheet 41 is located on the junction line between the opposite sides 44 and 45. The clamping bars 46b remotest from the laser device 48 are secured to a support plate 50 on which are mounted the mechanical means for uniformly displacing both vices 42 and 43 as a whole. In the case considered, the said mechanical means are constituted by a dovetail guide slot 51 provided in the lower portion of the support plate and by means of which the latter can slide along a stationary counter-guide 52 of a complementary shape. The uniform displacement is ensured by a quite simple system comprising a bar 53 fixed to and moving jointly with the plate 50 and provided with a tapped hole 54 in which is passed a threaded rod 55. The rotation of the threaded rod 55 causes a longitudinal displacement of the plate 50 along the counter-guide 52, thus ensuring welding of the sides 44 and 45 over the whole height of the can body.

It is thus apparent that sheet material portions which respectively terminate in the edges 44 and 45 are placed with respect to each other in such a position that these sheet material portions are in edge-to-edge relation, without any overlap, at these edges which thus form a junction line between the sheet material portions. The laser-beam generating means 48 is situated with respect to the sheet material portions to direct the laser beam 48a in that plane which contains the junction line formed by the adjacent confronting edges of the sheet material portions toward and into engagement with the edges at this junction line. In order to maintain these sheet material portions in the above edge-to-edge relation, the sheet material portions are clamped to support means 50 with clamping forces which extend perpendicularly with respect to the sheet material portions in directions parallel to the above plane, and the sheet material portions are held in edge-to-edge relation as set forth above only by way of these clamping forces so that during welding there are no forces pushing the above edges 44 and 45 toward each other, thus avoiding the possibility of creating a surplus thickness at the weld. Since the edges are not pressed against each other, they do not distort and their junction line remains accurately located at the location of the focus spot of the laser.

Again, the tubular body may be expanded for increasing the cross-section and decreasing the thickness.

The embodiments described and illustrated have been given by way of example only and it should be understood that the scope of the invention extends to those variations which will appear to those skilled in the art to which the invention relates.

For instance, the embodiments of FIGS. 5a, 5b and 7 may be used to weld tubular bodies which have a length corresponding to several cans and which are subsequently cut into fractional lengths, possibly after radial expansion. Then the metal sheet may be precut at distances corresponding to the length of individual bodies.

We claim:

1. Process for manufacturing a tubular body for a preserved food can, comprising the steps of rolling up a metal sheet of small thickness until the opposite edge portions of the sheet contact to form a tube section and welding said edge portions in edge to edge relation without overlap with a laser beam which insures a resistance to tensile forces equivalent to that of the metal sheet and subjecting the tube section to radial expansion to obtain a tubular body having an increased cross-sectional area and a decreased wall thickness as compared with said tube section.

2. Process according to claim 1, wherein the cross sectional area of the tubular body is increased by approximately 50% by said expansion.

3. Process according to claim 1, wherein the thickness of the metal sheet is of from 0.2 to 0.3 mm before expansion.

4. Process for manufacturing a tubular body for a preserved food can, comprising the steps of rolling up a metal sheet of thickness of from 0.2 to 0.3 mm until the opposite edge portions of the sheet contact to form a tube section and welding said edge portions in edge to edge relation without overlap with a laser beam which insures a resistance to tensile forces equivalent to that of the metal sheet, wherein the rolling and welding steps are carried out by circulating a metal sheet having a length much in excess of the length of an individual food can tubular body into an external guide which rolls up said sheet until its opposite edges are in contact and said edges are pressed against a stationary internal core, said core and said guide being proportioned to define a radial gap of a size selected for preventing overlapping of the edges, and then through a location where the laser beam is focussed for forming said tube section and wherein said tube section is later severed into individual tubular bodies.

5. Process according to claim 1, wherein the edges are maintained in contact during welding by claws against which the regions of the sheet close to the edges are retained by vacuum forces, said claws being located to retain the edges in edge to edge relation without exerting substantial edge to edge abutting forces directed transversely to the weld in the circumferential direction of the tube section.

6. Process according to claim 1, wherein the laser beam is focussed over a width less than 0.05 mm in the thickness of the joint between the edges and the power density is 5000 kW/cm$^2$ at least.

7. Process according to claim 1, wherein the edges of the sheet are maintained, during welding, with a vertical offset at most equal to 20% of the thickness of the sheet.

8. Process according to claim 1, for manufacturing a tubular body for preserved food can, wherein the metal of the sheet is black iron, black iron coated on the inside with a protecting varnish, chrome iron, or iron superficially alloyed with tin.

9. A welding apparatus comprising:
support means provided with a pair of elongated parallel clamping means actuatable for clamping two opposite edge regions of a metal sheet portion formed into a tube section, with corresponding confronting edges of the edge regions situated between the pair of clamping means next to each other and level to each other for forming a rectilinear junction line situated between the pair of clamping means, and for releasing said edge regions, said clamping means being adapted to cooperate with the sheet portion for clamping the latter with clamping forces which are substantially perpendicular to the edge regions without substantially forcing said edges into abutment, said clamping means forming the only means which holds the sheet material portions in edge-to-edge relation forming said junction line,
stationary guiding means operatively associated with said support means for guiding the latter along a path parallel to said junction line,
laser beam generating means having, with respect to said support means, a location for directing a laser-beam between said clamping means at a point in the path of said junction line to engage the sheet portion at the junction line formed by the edges thereof,
and means operatively associated with said support means for moving the latter with respect to said laser-beam generating means in a direction and with a speed causing the sheet portion to be welded progressively along said junction line.

10. A method of manufacture of a tubular body for a preserved food can and the like, comprising the steps of: forming a metal sheet of low thickness into a tube section with adjacent confronting edges with clamping forces exerted on two edge regions of said metal sheet in the vicinity of said edges; welding said edges in edge to edge relation without overlap by circulating the confronting edges in a laser beam for providing a junction having a resistance to tear substantially equal to that of the metal sheet without substantial longitudinal overthickness along the welding line; and subjecting the tubular body to radial expansion to increase its cross-sectional area and decreasing the metal sheet thickness.

* * * * *